April 21, 1953  F. E. GILMORE  2,635,707
FIXED BED CYCLIC ADSORPTION APPARATUS
Filed Dec. 15, 1949
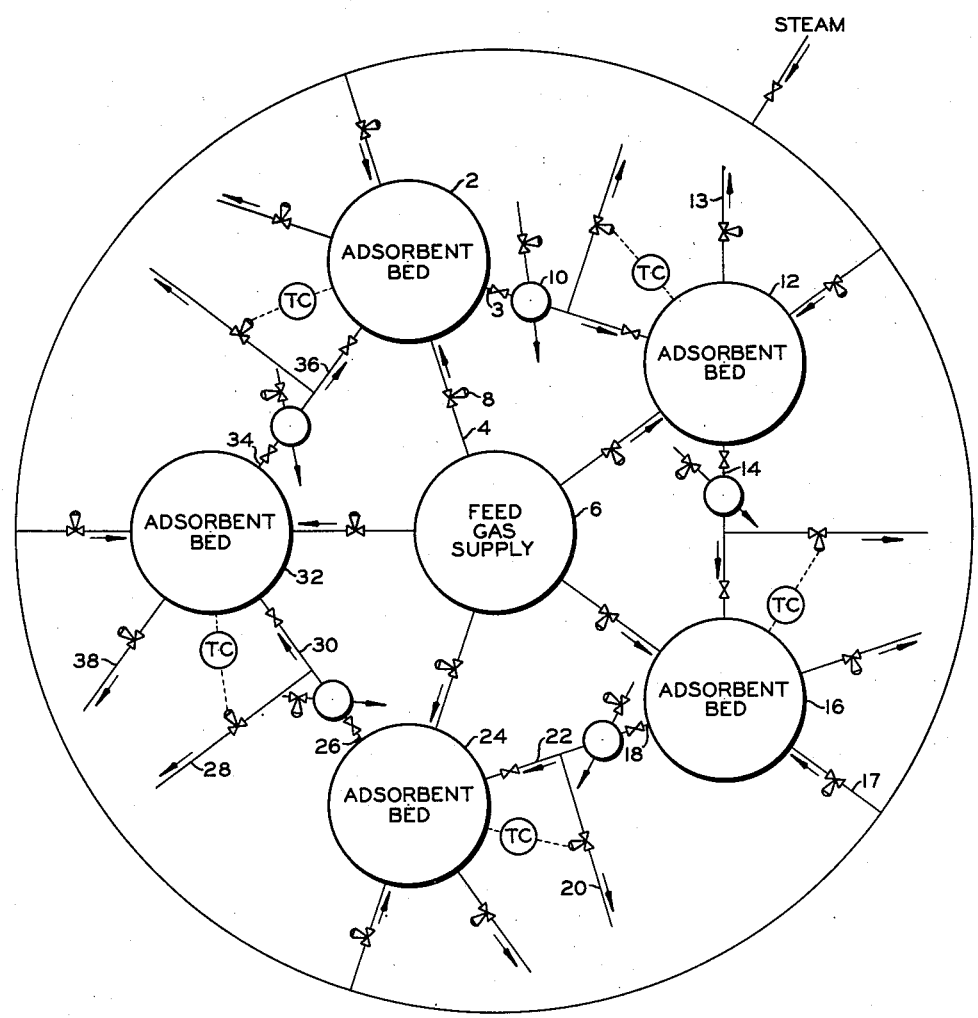
*INVENTOR.*
F. E. GILMORE
BY *Hudson and Young*
*ATTORNEYS*

Patented Apr. 21, 1953

2,635,707

UNITED STATES PATENT OFFICE 2,635,707

FIXED BED CYCLIC ADSORPTION APPARATUS

Forrest E. Gilmore, Bartlesville, Okla., assignor to Phillips Petroleum Company, a corporation of Delaware Application December 15, 1949, Serial No. 133,031

2 Claims. (Cl. 183—4.7)

This invention relates to the separation of materials. In one of its more specific aspects it relates to the separation of low-boiling normally gaseous hydrocarbon materials. In another of its more specific aspects it relates to the selective adsorption separation of low-boiling normally gaseous hydrocarbon materials utilizing a bed of a selective adsorbent. In still another of the more specific aspects it relates to the treating of natural and/or refinery gas streams to separate and recover gasoline and low-boiling normally gaseous hydrocarbon materials, such as methane, $C_2$'s, $C_3$'s and/or $C_4$'s.

Selective adsorption processes using selective adsorbents, such as activated-charcoal, silica gel, etc., to separate gaseous mixtures into two or more fractions are known in the art. The prior art teaches the use of fixed bed, cyclic fixed bed, and continuous moving-bed processes using various selective adsorbents. However, each of these processes has certain disadvantages. For instance, the known fixed bed processes will not recover hydrocarbon fractions of high purity while recovering a high percentage of the desired component from the feed. The known cyclic fixed-bed processes while being semi-continuous will not recover hydrocarbon fractions of high purity while recovering a high percentage of the desired components from the feed and continuous moving-bed processes tend to be expensive to operate due to the fact that the adsorbent is lost due to attrition as well as by poisoning because of impurities in the material to be separated which cannot readily and/or economically be eliminated so as to reactivate the adsorbent. For example, it is both expensive and difficult to strip $C_5$ and heavier hydrocarbon materials, such as an absorption oil, from activated charcoal. In addition, processes utilizing a moving-bed of activated-charcoal, or other materials which will selectively absorb hydrocarbon materials or other materials for separation and recovery of fractions of for instance, low-boiling normally gaseous hydrocarbons, such as butane, propane, and ethane, is not practical at pressures above about 480 pounds per square inch absolute because of the expense and difficulty in stripping the absorbed hydrocarbons and in regenerating the selective adsorbent.

For these reasons, selective adsorption separation and recovery of low-boiling normally gaseous hydrocarbon streams using moving-beds of adsorbent is usually carried out at pressures not above about 400 pounds per square inch absolute. Many available hydrocarbon gas streams have pressures of 400 pounds per square inch absolute and higher, and it is not practical to directly separate and recover $C_2$, $C_3$, and $C_4$ hydrocarbons by using a moving-bed selective adsorption separation system from such high pressure gases. There are many natural gas fields, as well as refinery residue gases, existing at relatively high pressure of from 400 to 5000 pounds per square inch gauge from which it is desirable to recover gasoline and low-boiling normally gaseous materials, such as $C_2$, $C_3$, and/or $C_4$ hydrocarbons. The wet gases from many of these gas fields, particularly those fields of gases at pressures of from 1500 to 5000 pound per square inch gauge, are treated by a process known as a cycling process, that is, those hydrocarbons and other low-boiling normally gaseous materials which are not removed from the wet gas field are returned as dry gas to the field in order to maintain the pressure on the field so as not to lose recoverable hydrocarbons through the phenomenon of retrograde condensation. Since it is expensive to re-pressure the unrecovered hydrocarbons, it is desirable that the gases to be returned to the field are maintained at as high a pressure as possible. Also, maintaining pressure in a non-cycling plant is usually very desirable since residue gases are usually sold or used as fuel and it is usually desired to produce them at as high a pressure as possible. Further, it is desirable, if possible, to treat the wet field gas at or near its relatively high field gas pressure so that high adsorption pressures, such pressures as from 1000 to 5000 pounds per square inch absolute, may be used in removing $C_5$ and heavier hydrocarbons from the wet field gas. As will hereinafter be set forth, I have invented a process which can advantageously be used, in conjunction with and co-operating with an oil absorption system used to remove $C_5$ and heavier hydrocarbons from a wet gas, to separate and recover low-boiling normally gaseous hydrocarbon materials, such as $C_2$'s, $C_3$'s, and/or $C_4$'s from the overhead from a high pressure oil absorber. Pressure is no limitation on the process of my invention. This one particular advantageous application of the process of my invention offers a wet gas treating process requiring very little equipment and eliminating the usual expensive distillation equipment and re-absorption equipment found in the usual wet gas treating plant used today.

I have invented a process for separating a mixture of gaseous materials into two or more fractions. A specific embodiment of my invention is a process for separating and recovering a low-boiling hydrocarbon fraction and a lower-boiling hydrocarbon fraction from a gaseous mixture comprising low-boiling normally gaseous hydrocarbons. In carrying out one embodiment of my invention I pass a low-boiling normally gaseous hydrocarbon mixture into a separation zone containing a bed, preferably a fixed bed, of a selective adsorbent and therein I selectively adsorb the low-boiling hydrocarbons which I desire to recover. The unadsorbed lower-boiling hydrocarbon gases are withdrawn from the separation zone. In the next step in the process of my invention I introduce a gaseous portion of a low-boiling hydrocarbon stream, preferably a portion of the low-boiling hydrocarbon stream which I desire to recover, into the separation zone and therein I displace lower-boiling hydrocarbons which are adsorbed on the adsorbent along with the low-boiling hydrocarbons which I desire to recover. I have discovered that in operating in this manner I can produce very pure hydrocarbon fractions, that is, either very pure streams of individual hydrocarbons or very pure fractions of more than one hydrocarbon material. The lower-boiling hydrocarbon materials which were displaced in carrying out the last-mentioned "reflux" step of my process are withdrawn from the separation zone. Next I remove the low-boiling hydrocarbon materials from the adsorbent by introducing a stripping gas, preferably steam and/or heated product gas, into the separation zone. The desorbed low-boiling hydrocarbon materials are withdrawn from the separation zone along with stripping gas. If steam is used as the stripping gas, the steam can be separated from the product, if desired, and I find that this can conveniently be done by condensing the steam and separating the water from the low-boiling hydrocarbons by a simple decanting operation. In addition, I find that I can use steam and product gas resulting from stripping as the displacing gas in the "reflux" step of the process of my invention. Selective adsorbents, particularly activated-charcoal, are good dessicants and unabsorbed residue gas can be used to cool and dry the selective adsorbent prior to adsorption of the feed gas mixture.

I have invented a relatively simple and a very efficient method of treating a gas stream, such as a natural gas and/or a refinery residue gas, defined as a gaseous mixture comprising $C_1$ to more than $C_5$ hydrocarbons and other low-boiling normally gaseous material, which is particularly adaptable to treating wet gases from a field, back to which unrecovered light hydrocarbons must be returned, in order to maintain pressure on the field. If the gaseous mixture to be treated is a natural gas it will usually be comprised of saturated hydrocarbons, while if it is a refinery residue gas it may or may not contain unsaturated hydrocarbons. In carrying out this specific embodiment of the process of my invention, I remove $C_5$ and heavier hydrocarbons from the rich feed gas in an absorption system using an absorption medium such as mineral seal oil to absorb $C_5$ and heavier hydrocarbons. The low-boiling normally gaseous hydrocarbon material, such as $C_2$'s, $C_3$'s, and/or $C_4$'s, is then separated and recovered as desired by using the selective adsorption separation process of my invention.

One of the principal advantages of the process of my invention is that a very pure low-boiling hydrocarbon material stream can be recovered without the use of a continuous moving-bed selective adsorption separation process which in its very nature breaks up and loses the adsorbent, particularly activated-charcoal, by attrition. The only appreciable loss of adsorbent occurring in operating by the process of my invention is through poisoning of the adsorbent, and this loss is relatively low. As will be seen hereinafter, the process of my invention is not limited as to pressure and residue gases may be delivered at substantially the same pressure as the feed. In operating the process of my invention, adsorption may be carried out at a high pressure while desorption and reactivation may be carried out at low pressure thus lowering the utility costs necessary for desorption and reactivation of the adsorbent. Due to the fact that adsorption may be carried out at high pressures, a relatively small amount of selective adsorbent, such as activated-charcoal, may be used to treat a relatively large amount of feed.

It is an object of this invention to provide a method for the separation of materials.

It is another object of this invention to provide a method for the separation of low-boiling normally gaseous hydrocarbon materials.

Still another object of this invention is to provide a method for the selective adsorption separation of low-boiling normally gaseous hydrocarbon materials utilizing a fixed bed of an adsorbent, such as activated-charcoal, silica gel, etc.

Still another object of this invention is to provide a method for treating a natural and/or refinery residue gas stream to separate and recover, separately, gasoline and low-boiling normally gaseous hydrocarbon materials, such as methane, $C_2$'s, $C_3$'s, and/or $C_4$'s.

Other objects and advantages of the process of this invention will become apparent, to one skilled in the art, upon reading this disclosure.

The drawing which accompanies and is a part of this disclosure diagrammatically sets forth a preferred specific embodiment of the process of my invention. It sets forth a cyclic embodiment of the process of my invention wherein a feed stream can be separated into three fractions, for instance, a stream comprising methane, ethane and propane can be separated into three fractions, one comprising methane, one comprising ethane and the other comprising propane.

The process of my invention can be used to separate a mixture of materials, particularly low-boiling normally gaseous hydrocarbon materials, into two or more fractions. Some of the separations to which the process of my invention can advantageously be applied are the treating of low-boiling normally gaseous hydrocarbon materials separated from natural and/or refinery residue gases to separate and recover relatively pure $C_3$'s and $C_4$'s, or to separate and recover a $C_2$ stream, a $C_3$ stream, and a $C_4$ stream, or a $C_2$ stream and $C_3$ and $C_4$ stream can be produced, etc.; nitrogen can be removed from natural gas; hydrocarbon synthesis gases can be treated to remove $CO_2$, $H_2S$ and carbonyl sulfides; methane and HCl can be separated; acetylene can be recovered from the products resulting from the partial oxidation of natural gas for the production of acetylene; ethylene can be recovered from gas streams containing same; etc. In a preferred specific embodiment of the process of my invention, a natural and/or refinery residue gas is treated to separate and recover gasoline and low-boiling normally gaseous hydrocarbon materials, such as ethane which can be cracked to produce ethylene, propane suitable for LPG (liquid petroleum gas) without further fractionation or which can be cracked to produce ethylene, and butane suitable for LPG or to be used as desired.

The drawing sets forth a preferred specific embodiment of the process of my invention which operates cyclically. The system depicted by the diagrammatic flow sheet is used to separate the feed stream into three fractions. One skilled in the art will readily see that the system can be used to produce more than three product streams by using more than the five adsorbent beds depicted. Also, it will be readily seen that fewer adsorbent beds are required to separate a feed stream into two fractions. In addition, it will be obvious, to one skilled in the art, that the unique "refluxing" step of the process of my invention can be applied to a fixed bed non-cyclic process to produce fractions of high purity. To teach one skilled in the art how to carry on the process of my invention the following discussion pertains to the separation of a feed gas stream, such as a hydrocarbon stream comprised of methane, $C_2$ and $C_3$ hydrocarbons, into three fractions, a bottom or heavy product fraction, a side or light product fraction and an overhead or residue fraction, such as a $C_3$ stream, a $C_2$ stream and a methane stream, respectively. However, it is to be understood that the following discussion is not to unduly limit the scope of my invention.

Referring now to the drawing, which diagrammatically sets forth one way of applying my invention. It depicts five chambers in each of which is a bed of activated-charcoal. The five chambers are shown arranged in a circular pattern for convenience of diagramming only, and they can be arranged in any suitable or convenient manner. Piping and valve arrangements, operating under automatic control, are arranged so that each chamber acts successively as an adsorber, a final rectifier, an initial rectifier, a stripper and a cooler. As shown in the drawing for a single cycle of five cycles, the following operating conditions exist. Chamber 2 is the adsorber and feed gas enters the lower portion of it through line 4 from feed gas supply header 6 through the open motor valve or other valve 8 in line 4. Gases to be recovered are adsorbed by the activated-charcoal in adsorber 2. Overhead unadsorbed gases are withdrawn from adsorber 2 via line 3 and are passed through an indirect heat exchanger 10 wherein the gases are cooled. The cool gases are then passed into the lower portion of chamber 12 which has previously been stripped and this cool gas cools the activated-charcoal in chamber 12. Residue gases are withdrawn from chamber 12 via line 13. Toward the end of the cycle, as the activated-charcoal in adsorber 2 becomes saturated with the components of the feed gas which are to be recovered, some of the lowest boiling constituents will be adsorbed in chamber 12. During this cycle line 14 between chambers 12 and 16 is closed. Chamber 16 is the stripper whose activated-charcoal bed contains the highest boiling components of the feed gas that are to be recovered. Superheated steam is fed into the lower portion of stripping chamber 16 via line 17, therein the superheated steam desorbs the highest boiling components recovered from the feed. Resulting desorbed effluent gases and steam are withdrawn from its upper portion via line 18, and this mixture is divided into two portions by suitable means (not shown on the drawing), such as a ratio controller. One portion is withdrawn as heavy make product via line 20. I find that the heavy make product and steam can be conveniently separated by condensing the steam. The other portion is passed via line 22 into the lower portion of chamber 24, which is the first rectifier. This portion of gas and steam displaces the lighter product previously adsorbed in this chamber 24 when it was the adsorber. Resulting displaced lighter product is withdrawn from the upper portion of chamber 24 via line 26, and it is divided into two portions by suitable means (not shown in the drawing), such as a ratio controller. One portion is withdrawn via line 28 as a light or side product make gas. The other portion is passed via line 30 into the lower portion of chamber 32 which in the previous cycle was the adsorber, thereby displacing the adsorbed gases lighter than the light product stream and saturating or substantially saturating the activated-charcoal in chamber 32 with the light or side products which will be recovered in the next cycle. The overhead gases from chamber 32 (the second rectifier) are withdrawn from its upper portion via line 34. They can be returned to adsorber 2 via line 36, that is, if the stripper and rectifier pressure is slightly greater than the pressure on the adsorber or, if not, they can be compressed and returned. Otherwise, they can be produced as an overhead residue gas stream which is withdrawn via line 38.

In the above set forth discussion, a flow scheme and operating method is described for a cycle of operations. On the drawing each adsorbent bed or chamber is so piped and valved, and provided with cooling means, that it can function in each of the five operations of adsorbing, cooling, stripping, first rectification and second rectification. As can be seen in each successive cycle, the use to which the various chambers are put is changed as though the processing diagram were rotated one-fifth of a turn to the left with the numbered chambers standing still. The change in the use of the chambers as the cycles are changed is shown in the following table:

| Cycle No. | Use of Chambers During Each Cycle ||||| 
|---|---|---|---|---|---|
| | Adsorber | Cooling | Stripping | 1st. Rectifier | 2nd. Rectifier |
| 1 | 2 | 12 | 16 | 24 | 32 |
| 2 | 12 | 16 | 24 | 32 | 2 |
| 3 | 16 | 24 | 32 | 2 | 12 |
| 4 | 24 | 32 | 2 | 12 | 16 |
| 5 | 32 | 2 | 12 | 16 | 24 |

Cooling means have been shown in the overhead gas lines from each of chambers 2, 12, 16, 24 and 32 for convenience in diagramming only. In practice I find it desirable to use a single gas cooler with a manifolding system containing control valves to successively direct the overhead streams through it. Usually, only the overhead gas stream, that withdrawn overhead from the adsorber and passed through the chamber on the cooling cycle, will be cooled during any cycle.

In the drawing, thermally controlled valves are used to control the product streams, the control points being in the following rectifier. After the desired temperature is reached in a rectifier bed, indicating what adsorption is taking place, the valve in the product line ahead of this rectifier opens and all the overhead gas from the previous chamber passes off as the product stream for the balance of the cycle.

In the drawing I have shown diaphragm motor valves controlling the flow of the various gas streams and the stripping steam. Make product gas can be used as the stripping gas and could be controlled in the same manner. The means of operating these valves is not shown. Such valving is shown only as a method of how my process can be operated, and is not to unduly limit the scope of my invention. The diaphragm motor valves can consist of rotary valves with five separate exhaust ports and similar rotating valves could be used to control the product streams. With feed streams of substantially constant composition and volume, timing mechanisms can be used to control the cycles.

Additional chambers can be added to my selective adsorption separation process for recovery of additional product streams or the number can be reduced to three to make two product streams without departing from the unique specific embodiment of the process of my invention.

I find that cooling water is a satisfactory coolant for cooling the overhead gases from the adsorber prior to their use to cool the activated-charcoal which has been heated due to stripping. Other coolants can be used with good results.

Cooling coils and/or heating coils can be provided in each of the chambers for the purpose of cooling the activated-charcoal after stripping or to heat it during stripping. However, I prefer to use cool residue gas for cooling and superheated steam or hot make product gas for stripping.

My process offers the following: (1) products of high purity hydrocarbon streams through the use of a reflux stream of hydrocarbon product gases; (2) reactivation of the activated-charcoal, if desired, under a lower pressure than that used for adsorption and refluxing; (3) different operating pressures for each step, if desired, such as desorption at a lower pressure than that of adsorption and refluxing.

The process of my invention can be operated manually or automatically. If automatic operation is desired, the various cycles can be either time controlled, controlled by gas analysis of the effluent streams, for instance, analytical analysis, specific gravity, heating value, etc., or controlled by the selective adsorbent bed temperatures which give a good indication of the particular component being adsorbed at any particular point in the bed. During the stripping operation of the process of my invention, the pressure can be reduced, making stripping easier and requiring less utilities. Also, if steam is used as a stripping medium and subsequently condensed, stripping is aided by effectively lowering the stripping pressure. As hereinbefore set forth, subsequent to the stripping operation, the beds are purged with a stream of residue gas to cool the bed, remove any moisture remaining after the stripping operation, and at least partially saturating the bed with the lightest hydrocarbon, thereby increasing the adsorptive capacity of the bed.

Any particle size of adsorbent can be used which doesn't, of course, create an excessive pressure drop by plugging the separation zone or which is not too large to reduce the adsorptive capacity to a great extent. The beds can be fluidized beds of adsorbent, if desired. However, I prefer to use fixed beds of the adsorbent, preferably activated-charcoal, having a particle size of from 5 to 60 mesh. In operations wherein maintaining a relatively high pressure on the residue gas is not desired or necessary, I prefer to carry on $C_3$, $C_4$ or $C_3$ and $C_4$ adsorption at a temperature of from 50 to 250° F. and at a pressure of from atmospheric to 250 pounds per square inch absolute. Likewise, if maintaining residue gas pressure is not desired or necessary, I prefer to carry on $C_2$, or $C_2$ and $C_3$ adsorption at a temperature of from 50 to 150° F. and at a pressure of from atmospheric to 250 pounds per square inch absolute. If $C_2$, $C_3$ and $C_4$ adsorption is carried on, I prefer to adsorb at a temperature of from 50 to 250° F. and at a pressure of from atmospheric to 250 pounds per square inch absolute. In the refluxing step of the process of my invention, I prefer to reflux at a temperature of from 50 to 250° F. for $C_3$ and/or $C_4$ refluxing and at a temperature of 50 to 150° F. for $C_2$ and/or $C_3$ refluxing, and at a pressure of from atmospheric to 250 pounds per square inch absolute in both cases. In the case where $C_2$, $C_3$ and $C_4$ adsorption is carried on at the same time, I prefer to carry on refluxing at a temperature of from 50 to 250° F. and at a pressure of from atmospheric to 250 pounds per square inch absolute. If desired, the pressure on the beds can be lowered after adsorption to remove lighter hydrocarbons adsorbed on the charcoal. The "refluxing" step can then be used to further remove lighter hydrocarbons by displacement. I prefer to strip or desorb the $C_3$, $C_4$ or $C_3$ and $C_4$ fractions at a temperature of from 325 to 700° F. and at a pressure of from atmospheric to 40 pounds per square inch absolute, and I prefer to strip or desorb the $C_2$ or $C_2$ and $C_3$ fraction at a temperature of from 200 to 550° F. and at a pressure of from atmospheric to 40 pounds per square inch absolute. In the cooling and drying step of the process of my invention, I prefer to cool the adsorbent beds to a temperature of from 35 to 250° F. If the adsorbent beds become poisoned due to impurities in the feed such as $C_5$ and heavier hydrocarbons, which are not removed in the stripping operation, I find that the adsorbent can be regenerated, preferably using superheated steam, the regeneration being carried on at a temperature of from 650 to 1150° F. and at a pressure of from atmospheric to 25 pounds per square inch absolute.

In a preferred specific embodiment of the process of my invention, I separate and recover a low-boiling normally gaseous hydrocarbon material fraction and a lower boiling hydrocarbon material fraction from a hydrocarbon material mixture comprising said low-boiling normally gaseous hydrocarbon material fraction, said lower hydrocarbon material fraction and higher boiling hydrocarbon materials. For example, I can treat a natural and/or refinery residue gas to recover gasoline and low-boiling normally gaseous hydrocarbon materials, such as $C_2$, $C_3$ and/or $C_4$ hydrocarbons. I define such a natural and/or refinery residue gas as one being comprised of $C_1$ to more than $C_5$ hydrocarbons and other low-boiling normally gaseous materials. Usually a natural gas will be comprised of saturated hydrocarbons while a refinery residue gas contains some olefins. I find that due to the cost of stripping and regeneration of selective adsorbents, it is undesirable to have more than a small amount of $C_5$ and higher boiling hydrocarbons in the feed to my selective adsorption separation process. I prefer that the feed to my selective adsorption separation process be substantially free of $C_5$ and higher boiling hydrocarbons. This process of my invention uses the selective adsorption separation process of my invention in conjunction with and cooperating with an absorption process which is used to remove $C_5$ and higher boiling hydrocarbons from the natural and/or refinery residue gas. This preferred specific embodiment of the process of my invention is particularly adaptable to treating high pressure gases wherein it is desirable or necessary to maintain the residue gas at substantially the same pressure as the feed or wet gas so that residue gas can be recycled, such as to a gas field, without necessitating expensive compression. In carrying on this process of my invention, $C_5$ and higher boiling hydrocarbons are removed from the natural and/or refinery gas by absorbing same in a liquid absorption medium, preferably a liquid absorption oil. The $C_4$ and lower boiling hydrocarbons and other low-boiling normally gaseous materials are treated by the selective adsorption separation process of my invention. The $C_5$ and higher boiling hydrocarbons are separated from the liquid absorption medium in a distillation and recovery zone which can comprise flashing, venting, stripping and/or fractional distillation operations. The resulting lean absorption medium is then recycled to the absorption operation. The $C_4$ and lower boiling hydrocarbons resulting from the above-mentioned flashing, venting, stripping and/or fractional distillation operations, used in recovering $C_5$ and higher boiling hydrocarbons, can be treated by the selective adsorption separation process of my invention.

The above set forth discussions of the process of my invention, as depicted by the drawing and the preferred specific embodiments of the process of my invention, are typical examples of the application of the process of my invention. However, it is to be understood that such discussion and examples are not to unduly limit the scope of my invention.

As will be evident to those skilled in the art, various modifications of this invention can be made, or followed, in the light of this disclosure and discussion, without departing from the spirit or scope of this disclosure or from the scope of the claims.

I claim:

1. Apparatus for recovering the components of a low-boiling normally gaseous hydrocarbon mixture comprising a closed series of chambers containing fixed beds of selective adsorbent; feed gas supply means comprising a conduit extending to each of said chambers, and a valve in each said conduit; a conduit extending from the upper end portion of each of said chambers to the lower end portion of the next succeeding chamber; a valve in each of said conduits; a cooler in indirect heat exchange with each of said last mentioned conduits; a valve for controlling each of said coolers; a product removal conduit including a valve extending from each of said last mentioned conduits; a stripping gas supply conduit including a valve connected to the lower end portion of each of said chambers; a product take-off conduit including a valve extending from the upper end portion of each of said chambers; and means for successively operating said valves whereby said chambers are operated through cycles of successive cooling, adsorption, rectification, and stripping.

2. Apparatus for separating and recovering a low-boiling fraction and a lower-boiling fraction from a gaseous mixture comprising low-boiling normally gaseous hydrocarbons, which comprises, in combination; at least five chambers in a closed series arrangement containing fixed beds of selective adsorbent, feed gas supply means comprising a conduit extending to each of said chambers, and a valve in each said conduit; a conduit extending from the upper end portion of each of said chambers to the lower end portion of the next succeeding chamber, a valve in each of said conduits, a cooler in indirect heat exchange with each of said last mentioned conduits; a valve for controlling each of said coolers; a product removal conduit including a valve extending from each of said last mentioned conduits; a stripping gas supply conduit including a valve connected to the lower end portion of each of said chambers; a product take-off conduit including a valve extending from the upper end portion of each of said chambers; and means for successively operating said valves whereby said chambers are operated through cycles of successive cooling, adsorption, rectification, and stripping.

FORREST E. GILMORE.

References Cited in the file of this patent

UNITED STATES PATENTS

| Number | Name | Date |
|---|---|---|
| 1,422,007 | Soddy | July 4, 1922 |
| 1,522,480 | Allen | Jan. 13, 1925 |
| 1,533,716 | Voress et al. | Apr. 14, 1925 |
| 1,872,783 | Miller | Aug. 23, 1932 |
| 1,934,075 | Lewis | Nov. 7, 1933 |
| 2,017,779 | Vosburgh | Oct. 15, 1935 |
| 2,349,098 | Kiesskalt et al. | May 16, 1944 |
| 2,384,311 | Kearby | Sept. 4, 1945 |
| 2,428,885 | Luaces | Oct. 14, 1947 |
| 2,519,343 | Berg | Aug. 22, 1950 |
| 2,548,502 | Small | Apr. 10, 1951 |

FOREIGN PATENTS

| Number | Country | Date |
|---|---|---|
| 218,974 | Great Britain | May 14, 1925 |

OTHER REFERENCES

Publication: "Hypersorption Process For Separation of Light Gases," Clyde Berg, A. I. Ch. E. Transactions, 42, #4, August 1946, pages 665–680.